United States Patent
Grimmer et al.

(10) Patent No.: US 12,141,967 B2
(45) Date of Patent: Nov. 12, 2024

(54) COMPUTER-IMPLEMENTED METHOD FOR OPERATING A MEDICAL IMAGING DEVICE, IMAGING DEVICE, COMPUTER PROGRAM AND ELECTRONICALLY READABLE DATA MEDIUM

(71) Applicant: Siemens Healthcare GmbH, Erlangen (DE)

(72) Inventors: Rainer Grimmer, Erlangen (DE); Bernhard Krauss, Burgthann (DE)

(73) Assignee: Siemens Healthineers AG, Forchheim (DE)

( * ) Notice: Subject to any disclaimer, the term of this patent is extended or adjusted under 35 U.S.C. 154(b) by 344 days.

(21) Appl. No.: 17/547,343

(22) Filed: Dec. 10, 2021

(65) Prior Publication Data
US 2022/0198655 A1    Jun. 23, 2022

(30) Foreign Application Priority Data
Dec. 18, 2020  (DE) ................... 10 2020 216 306.5

(51) Int. Cl.
| | | |
|---|---|---|
| *G06T 1/20* | (2006.01) | |
| *G06F 7/544* | (2006.01) | |
| *G06F 9/50* | (2006.01) | |
| *G06F 12/0806* | (2016.01) | |
| *G06F 15/80* | (2006.01) | |

(Continued)

(52) U.S. Cl.
CPC .......... *G06T 7/0012* (2013.01); *G06V 10/761* (2022.01); *G06T 2207/10081* (2013.01); *G06T 2207/10116* (2013.01); *G06T 2207/30008* (2013.01); *G06T 2207/30101* (2013.01)

(58) Field of Classification Search
CPC ......... G06T 7/0012; G06T 2207/10081; G06T 2207/10116; G06T 2207/30008; G06T 2207/30101; G06V 10/761
See application file for complete search history.

(56) References Cited

U.S. PATENT DOCUMENTS

| | | | |
|---|---|---|---|
| 2010/0166273 A1* | 7/2010 | Wismuller | G06T 7/0012 |
| | | | 382/131 |
| 2018/0012382 A1 | 1/2018 | Proksa et al. | |

(Continued)

FOREIGN PATENT DOCUMENTS

| | | |
|---|---|---|
| DE | 102016219887 A1 | 4/2018 |
| DE | 102018210429 A1 | 1/2020 |

*Primary Examiner* — David F Dunphy
(74) *Attorney, Agent, or Firm* — Harness, Dickey & Pierce, P.L.C.

(57) ABSTRACT

A computer-implemented method for a medical imaging device is disclosed. In an embodiment, the computer-implemented method includes receiving at least one item of user information describing a desired visualization format of the image dataset; providing at least one item of request information; describing required input data of at least one evaluation algorithm to be used; determining at least one first processing dataset corresponding to the visualization format according to the user information and at least one second processing dataset usable as input data for the respective evaluation algorithm according to the request information; applying the at least one evaluation algorithm to the respective second processing dataset to determine evaluation information and outputting the first processing dataset and the evaluation information.

23 Claims, 4 Drawing Sheets

(51) Int. Cl.
*G06F 17/16* (2006.01)
*G06N 3/08* (2023.01)
*G06N 3/084* (2023.01)
*G06T 7/00* (2017.01)
*G06V 10/74* (2022.01)

(56) References Cited

U.S. PATENT DOCUMENTS

2018/0100907 A1 4/2018 Soza et al.
2020/0082525 A1 3/2020 Xu et al.

\* cited by examiner

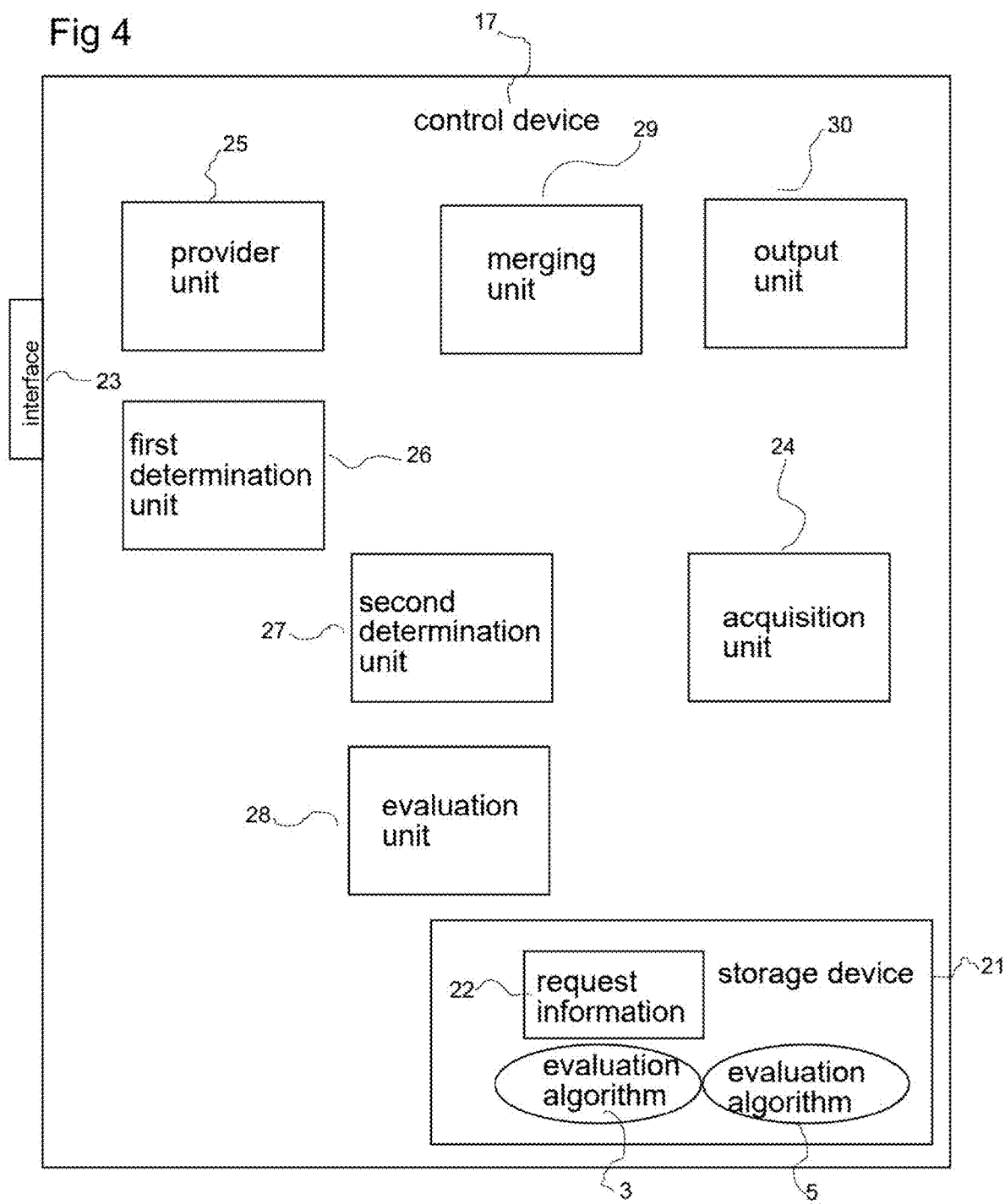

COMPUTER-IMPLEMENTED METHOD FOR OPERATING A MEDICAL IMAGING DEVICE, IMAGING DEVICE, COMPUTER PROGRAM AND ELECTRONICALLY READABLE DATA MEDIUM

PRIORITY STATEMENT

The present application hereby claims priority under 35 U.S.C. § 119 to German patent application number DE 102020216306.5 filed Dec. 18, 2020, the entire contents of which are hereby incorporated herein by reference.

FIELD

Example embodiments of the invention generally relate to a computer-implemented method for operating a medical imaging device, wherein an image dataset acquired via the imaging device, in particular via multi-energy computed tomography, in particular computed tomography, is evaluated, from which image dataset processing datasets that reproduce different image data contents can be determined via image processing. The invention further relates to an imaging device, in particular a computed tomography device, a computer program and an electronically readable data medium.

BACKGROUND

Medical imaging is a foundation of modern-day medical diagnostics. A plethora of information about the interior of the human body is obtained via ever more advanced imaging methods and imaging techniques, which information is not, however, apparent in every case directly by consideration of a processing dataset derived from the image dataset for a visualization format. Software programs/code, i.e. in particular evaluation algorithms that evaluate datasets, therefore play an increasingly important role in everyday clinical practice. As well as conventionally programmed evaluation algorithms or the corresponding computer programs, the use of artificial intelligence is also increasingly being proposed, with the result that evaluation algorithms have become known that comprise trained functions, for example neural networks. Evaluation algorithms, in particular those using artificial intelligences, are employed in order to resolve clinical issues, for example the tracking of a vessel in the human body, and to that end are trained on input data or developed for input data that shows the image contents to be assessed, in particular sufficiently clearly, so that subsequently reliable result information (output data) can also be supplied. This means that many evaluation algorithms are dependent on the data pool that was drawn upon for training or developing the evaluation algorithm, and deliver reliable results only on comparable input data. In routine clinical practice, it is also frequently the case with conventional imaging that the image data used for training or developing evaluation algorithms is similar enough to the image data of the field of application so that the evaluation algorithms that were trained on a data pool can be applied for any images of the field of application. This is due to the fact that the acquisition mode places the final image properties within certain bounds, which can no longer be changed subsequently.

However, advanced imaging techniques support a wealth of processing variants for accentuating or generally representing the most diverse image contents. Aside from the fact that significantly different image impressions can be created in the case of computed tomography datasets already by applying different filters, specifically different filter kernels, there exists a particularly large diversity in the case of the technique known as spectral X-ray imaging, also called multi-energy X-ray imaging or multi-energy imaging. For example, in a special case of multi-energy computed tomography, dual-energy CT, two different X-ray spectra are generated on the part of the radiation source of the image acquisition arrangement in order to obtain two different data subsets. For modern computed tomography devices, sensors known as photon-counting X-ray detectors ("photon-counting CT") are also increasingly gaining acceptance. In this case it possible, as it were, to count individual impact events of X-ray quanta striking the X-ray detector and to assess these in terms of their energy, i.e. to arrange events in order into an energy histogram, for example, such that data subsets are also produced for different energies and/or energy intervals. In multi-energy computed tomography, this gives rise to the possibility of fundamentally changing the image properties even after completion of the acquisition of the image dataset, such that a comparability/sufficient similarity of the resulting processing data is no longer given. This applies for example to the calculation of monoenergetic images, the basis material decomposition (this means the calculation of equivalent densities of two attenuating materials) and the material discrimination in which different materials in the image are highlighted or suppressed differently. For this reason, in the case of multi-energy computed tomography, the evaluation algorithms cannot be trained adequately based upon a generalized data pool and within a reasonable resource investment framework.

This in turn results in a serious restriction for a user of an imaging device embodied as a computed tomography device in terms of the selection of the visualization format when the acquisition of the image dataset serves a particular examination objective. Instead of a visualization format that the user would most like to see, the latter is limited in terms of the visualization format in such a way that they are suitable as input data for the evaluation algorithm. This in turn leads to the user either not being able to use the full scope of the possibilities of spectral X-ray imaging or having to forgo the support of evaluation algorithms. In any case, the user must accept a compromise in order, for example, to make a diagnosis, and cannot exploit the full potential of the imaging and the diagnostic assessment tools.

Thus, in one example, the calculation of the upfolded spine in the case of a calculated monoenergetic 40-keV image is less successful, but sufficiently reliably possible only at higher energies, in particular greater than 70 keV, even if the spine is clearly recognizable for a user in both cases. In another example, a representation of a vessel for example on what is termed a VNC image (virtual non-contrast image) cannot be calculated, even if for certain issues, for example the strength of the calcification, the VNC image would be helpful for the user.

SUMMARY

In this regard, it has already been proposed in the prior art to train evaluation algorithms for different visualization formats separately and repeatedly in order to provide the use of the evaluation algorithms for as many visualization formats as possible. However, the inventors have discovered that this is possible only to a very limited extent since on the one hand it means a separate development for each visualization format, on the other hand, however, in particular in the case of multi-energy computed tomography, many visualization formats exist which it is not useful for the evaluation algorithm to process, yet which have a clinical benefit, for example the just described vessel visualization without contrast agent, which however results in the vessels no longer being identified by the algorithms.

In at least one embodiment, an improved evaluation method is disclosed compared to the prior art, in particular an evaluation method permitting synergy effects.

Embodiments are directed to a method, an imaging device, a computer program and an electronically readable data medium. Advantageous embodiments will be apparent from the claims.

According to at least one embodiment of the invention, a computer-implemented method for operating a medical imaging device for evaluation of an image dataset acquired via the imaging device, in particular via multi-energy computed tomography, in particular computed tomography, from which image dataset processing datasets reproducing different image data contents can be determined via image processing, comprises:
  receiving at least one item of user information describing a desired visualization format of the image dataset,
  providing at least one item of request information describing required input data of at least one evaluation algorithm that is to be used, in particular according to the user information,
  determining at least one first processing dataset corresponding to the visualization format according to the user information and at least one second processing dataset which can be used as input data for the respective evaluation algorithm according to the request information,
  applying the at least one evaluation algorithm to the respective second processing dataset in order to determine evaluation information, and
  outputting the first processing dataset and the evaluation information on a visualization device.

In addition to the method, at least one embodiment of the invention also relates to an imaging device, in the present case a computed tomography device, which comprises a control device embodied to perform the method according to at least one embodiment of the invention. All statements in relation to the method according to embodiments of the invention can be applied analogously to the imaging device according to embodiments of the invention, via which the already cited advantages can therefore likewise be achieved.

The imaging device of at least one embodiment comprises at least one image acquisition arrangement, which can be formed for example by an X-ray emitter and an X-ray detector, in particular a photon-counting X-ray detector, wherein, in the case of a computed tomography device, the image acquisition arrangement may be mounted for example in a gantry so as to be rotatable around the patient. The control device comprises, generally speaking, at least one processor and at least one storage device(s), wherein functional units for performing the method according to at least one embodiment of the invention can be implemented by way of the processor.

A computer program according to at least one embodiment of the invention can for example be loaded directly into a memory of a computing device, in particular of a control device of an imaging device, and comprises program segments/code for performing the steps of a method according to at least one embodiment of the invention when the computer program is executed in the computing device. The computer program may be stored on an electronically readable data medium according to at least one embodiment of the present invention, which data medium therefore comprises control information stored thereon, which information comprises at least one computer program according to at least one embodiment of the invention and is embodied in such a way that when the data medium is used in a computing device, in particular in a control device of an imaging resonance device, the computing device is prompted to perform the steps of a method according to at least one embodiment of the invention. The electronically readable data medium may be a non-transitory data medium, a CD-ROM, for example.

A computer-implemented method according to at least one embodiment of the invention is for operating a medical imaging device to evaluate a computed tomography image dataset acquired via the medical imaging device from which image dataset processing datasets reproducing different image data contents are determinable via image processing, the method comprising:
  receiving at least one item of user information describing a desired visualization format of the image dataset;
  providing at least one item of request information describing required input data of at least one evaluation algorithm to be used;
  determining at least one first processing dataset corresponding to the visualization format according to the at least one item of user information and a respective at least one second processing dataset usable as input data for a respective evaluation algorithm of the at least one evaluation algorithm, according to the at least one item of request information;
  applying the at least one evaluation algorithm to the respective at least one second processing dataset to determine evaluation information; and
  outputting the at least one first processing dataset and the evaluation information on a visualization device.

At least one embodiment of the invention is directed to a medical imaging device, comprising:
  a controller for operating the medical imaging device to evaluate a computed tomography image dataset acquired via the medical imaging device from which image dataset processing datasets reproducing different image data contents are determinable via image processing, the controller being configured to perform at least:
    receiving at least one item of user information describing a desired visualization format of the computed tomography image dataset;
    providing at least one item of request information describing required input data of at least one evaluation algorithm to be used;
    determining at least one first processing dataset corresponding to the visualization format according to the at least one item of user information and a respective at least one second processing dataset usable as input data for a respective evaluation algorithm of the at least one evaluation algorithm, according to the at least one item of request information;
    applying the at least one evaluation algorithm to the respective at least one second processing dataset to determine evaluation information; and
    outputting the at least one first processing dataset and the evaluation information on a visualization device.

At least one embodiment of the invention is directed to a non-transitory computer program product storing a computer program to perform the method of at least one embodiment upon being executed on a control device of an imaging device.

At least one embodiment of the invention is directed to an non-transitory electronically readable data medium storing a computer program to perform the method of at least one embodiment upon being executed on a control device of an imaging device.

BRIEF DESCRIPTION OF THE DRAWINGS

Further advantages and details of the present invention will become apparent from the example embodiments described hereinbelow, as well as with reference to the drawings, in which:

FIG. 4 shows the functional structure of a control device of the imaging device.

DETAILED DESCRIPTION OF THE EXAMPLE EMBODIMENTS

Figure 1:
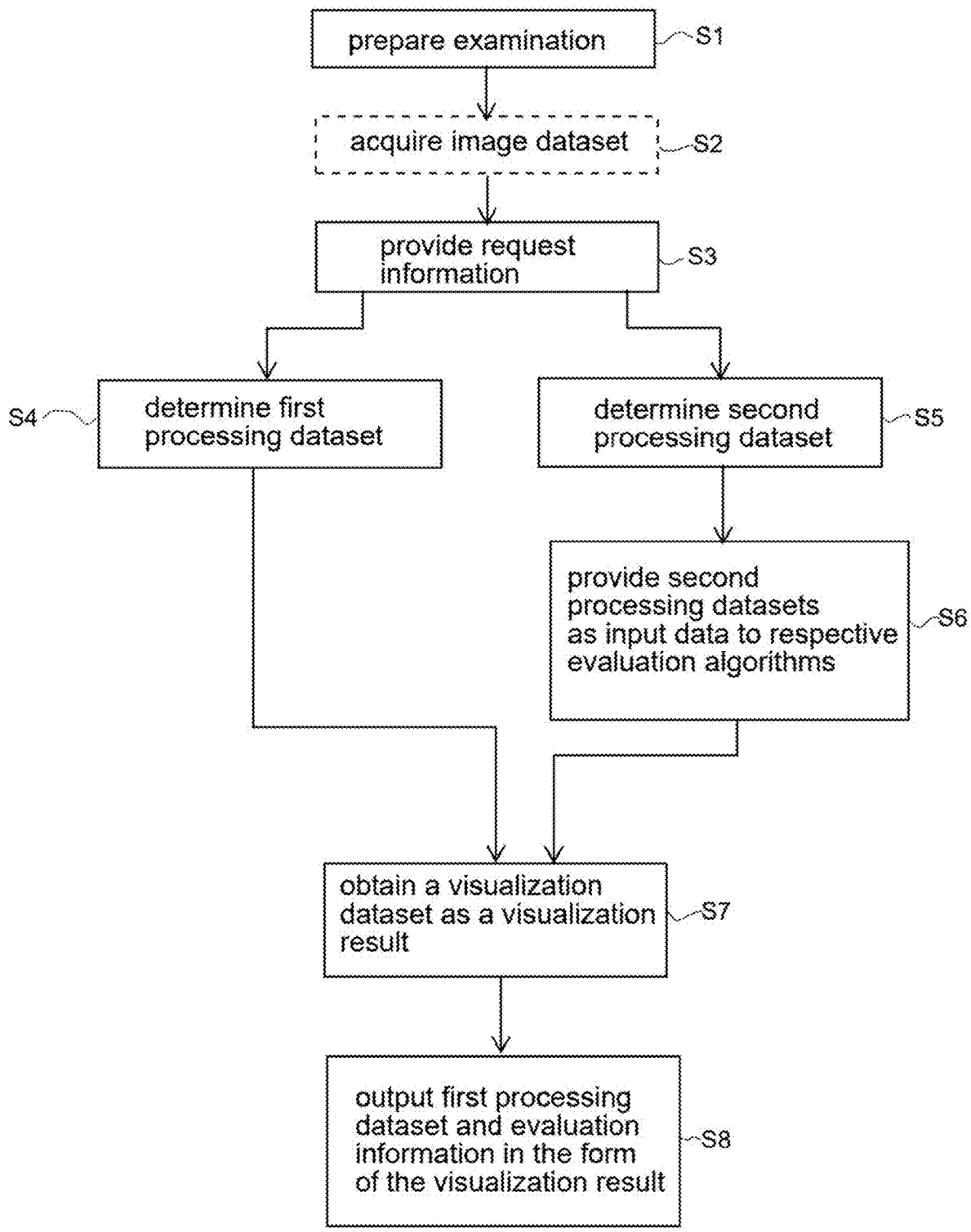
FIG. 1 shows a general flowchart of a method according to an embodiment of the invention.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to at least one embodiment of the invention, a computer-implemented method for operating a medical imaging device for evaluation of an image dataset acquired via the imaging device, in particular via multi-energy computed tomography, in particular computed tomography, from which image dataset processing datasets reproducing different image data contents can be determined via image processing, comprises:

receiving at least one item of user information describing a desired visualization format of the image dataset, providing at least one item of request information describing required input data of at least one evaluation algorithm that is to be used, in particular according to the user information, determining at least one first processing dataset corresponding to the visualization format according to the user information and at least one second processing dataset which can be used as input data for the respective evaluation algorithm according to the request information, applying the at least one evaluation algorithm to the respective second processing dataset in order to determine evaluation information, and outputting the first processing dataset and the evaluation information on a visualization device.

In this process, the acquisition of the image dataset per se can also constitute a part of the method in example embodiments, since it is known, for example, already prior to carrying out the examination, i.e. the image data acquisition, not only to specify the visualization format desired thereafter on an input device of the imaging device, but also to provide evaluation algorithms or desired evaluation information already in accordance with the examination objective. This applies in particular since formerly in the prior art, embodiments have already become known in which initially the evaluation algorithms to be used or desired evaluation information were chosen, which then limited the available visualization formats, as already explained above. Particularly advantageously, the present invention now permits a choice to be made from the entire available pool of visualization formats and evaluation algorithms since, in the background, regardless of the chosen visualization format, further second processing datasets are determined which permit the use of the corresponding evaluation algorithms. The user information can be received in particular by an input device of the imaging device, for example via an interface of the control device used for performing the method, and therefore, in addition to the information on the desired visualization format (and if necessary further processing parameters for the first processing dataset) particularly advantageously already includes also information relating to the evaluation algorithms to be used and/or desired evaluation information that permits suitable request information to be determined and provided. Request information for different evaluation algorithms to be used can be provided for example in a corresponding database and/or lookup table.

Both the user information and the request information can comprise processing parameters which describe how the corresponding processing datasets can be derived from the image dataset. For example, it can therefore be provided that the user information comprises at least one processing parameter preparing the output, in particular a slice thickness and/or a step size of a rotation. The user information can further comprise an image content parameter describing a desired image content, in particular contrast information, in particular also as a processing parameter. As already mentioned, it is conceivable that the user information is received by a user interface of the imaging device, in particular an input device.

Particularly advantageously, the imaging device is a computed tomography device since in particular in the field of computed tomography there exists a multiplicity of acquisition techniques in which processing datasets of a visualization format can be derived from the resulting image datasets, which processing datasets highlight or show different image contents. Basically, however, it is also conceivable within the scope of the present invention to apply the approach described here to other types of imaging devices, for example two-dimensionally imaging X-ray devices or magnetic resonance devices. In the case of magnetic resonance devices, for example, image datasets can be considered which show, for example in data subsets, different contrasts and/or from which processing datasets relating, for example, to different contrasts can be derived. An example from the field of magnetic resonance imaging is the technique known as the Dixon method, in which data subsets are acquired at different echo times in order to be able to differentiate spin species between which a chemical shift is present, for example spins of protons bound to fat and spins of protons bound to water.

Via the method according to at least one embodiment of the invention, the user can directly prepare on the imaging device, preferably via an input made there, to receive all the information that he or she requires, while, if the image dataset is present, he or she receives this information—without further necessary interaction—also correspondingly output, for example on a visualization device already immediately adjacent to the image acquisition arrangement. Basically, the imaging device can also comprise, in addition to the actual image acquisition device with image acquisition arrangement, an evaluation workstation with computing device for diagnostic assessment and/or an archiving system with computing device, wherein the evaluation steps can also take place there. Basically, the evaluation method according to at least one embodiment of the invention can, of course, also be used in other computing devices in which the image dataset is present, though it yields particular advantages in the context of the imaging device itself.

What is lastly proposed by at least one embodiment of the invention is a combined evaluation system in which the visualization format of the acquired image dataset displayed to the user is decoupled from the processing datasets which are called upon for the calculations of the at least one evaluation algorithm. The results of the individual substeps, i.e. the determination of the first processing dataset and the result information of the at least one evaluation algorithm, are finally combined so that the user receives as output not only his or her desired visualization format, but also the evaluation algorithm results, in particular in the form of the evaluation information.

In the method of at least one embodiment, the user information regarding the desired visualization format obtained as a result of user input is used to determine a first processing dataset, which can also be referred to as the first help volume, having this visualization format. In addition, for each evaluation algorithm to be used, the processing parameters for the visualization format that is suitable for the respective evaluation algorithm, i.e. the request information, is determined, for example queried, this request information being used to determine at least one second processing dataset, in particular as a second help volume, which is provided to the corresponding evaluation algorithm as input data in order to obtain result information of the evaluation algorithm which can then be used as or for determining the evaluation information.

Advantageously, therefore, an algorithmically independent infrastructure is used for the generalized solution of the problem of optimal evaluation and information provision instead of adapting each evaluation algorithm separately and adapting each visualization format separately. The user input is decoupled from the algorithmic calculation of the first processing dataset, i.e. of the user image, which in particular, as will be dealt with in more detail later, enables the result of the at least one evaluation algorithm to be applied to a processing dataset that is unsuitable for the evaluation algorithm, namely the first processing dataset.

The method according to at least one embodiment of the invention permits an improvement in result quality compared, for example, to an extended training of evaluation algorithms. The effort required is significantly reduced in a comparison for adapting the evaluation algorithms. Furthermore, consistent evaluation algorithm results for the assessments of the different visualization formats can be achieved via the present invention, both for an initial diagnosis and for a follow-up, so that, in other words, a standardization is also made possible. The solution described here is scalable to an arbitrary number of evaluation algorithms. This is in contrast to the hitherto known solution of the prior art, in which, when a plurality of evaluation algorithms were used, the intersection of the visualization formats became smaller and smaller, which in the extreme case resulted in no further execution option being possible because no visualization format was suitable as input data for all of the evaluation algorithms.

Furthermore, when employing the present invention of at least one embodiment, the user no longer needs to know about the internal workings of the evaluation algorithms in order to choose a suitable visualization format since this is totally decoupled from his or her desired visualization format, at least for the application of the evaluation algorithms, and the respective results are compiled only in a downstream step. In this regard, it should also be noted at this point that it is further permitted in principle also to provide certain evaluation information without a selection being necessary for this or a particular visualization format having to be selected by the user. The decision of the user in favor of one form of representation, i.e. visualization, implies no restriction or constraint as far as the diagnostic assessment tools are concerned.

To sum up, at least one embodiment of the present invention therefore provides a simplified, less restricted operator control, increased flexibility and a qualitatively and quantitatively improved evaluation and visualization result on the imaging device.

In this regard, an essential aspect of at least one embodiment of the present invention is the fact that the first processing dataset is unsuitable for obtaining meaningful results herefrom via the at least one evaluation algorithm. In other words, the first processing dataset does not fulfill in particular the requirement of the request information. An image content necessary for obtaining a relevant evaluation result via the evaluation algorithm is then not present, at least not to a sufficient extent. According to the present invention, evaluation information can nonetheless be determined and placed in the context of the first processing dataset, specifically its visualization format.

Whereas evaluation algorithms employing no artificial intelligence are also developed generally with regard to specific image contents and can therefore require specific input data, the present invention is applicable particularly advantageously when at least one of the at least one evaluation algorithms comprises a trained function which has been or is trained using respective second processing datasets. Generally speaking, a trained function, which may also be referred to as an artificial intelligence algorithm, maps cognitive functions that are associated with human brains. Via training based on training data, the trained function is able to adapt to new circumstances and to detect and extrapolate patterns.

Generally speaking, parameters of a trained function can therefore be adapted via training (machine learning). In particular, supervised learning, semi-supervised learning, unsupervised learning, reinforcement learning and/or adaptive learning can be used. In addition, representation learning (an alternative term is "feature learning") can also be used. In particular, the parameters of the trained function can be adapted iteratively via different training steps.

The trained function may for example comprise a neural network, a support vector machine (SVM), a decision tree and/or a Bayes network. The trained function may be based on k-means clustering, Q-learning, genetic algorithms and/or assignment rules. In particular, a neural network may be a deep neural network, a convolutional neural network (CNN) or a deep CNN. In addition, a neural network may be an adversarial network, a deep adversarial network and/or a generative adversarial network (GAN).

Using at least one embodiment of the present invention, it is sufficient to utilize a specific type of processing datasets as training data in order to train the respective evaluation algorithm, since precisely this training data, according to the request information, is also provided again in practice as the second processing dataset. In this way, extremely robust and reliable evaluation algorithms are produced since there is no need to compensate for variances in the visualization format.

Basically, the image dataset can be processed in different ways. It may therefore be, for example, a computed tomography dataset to which filters having different filter kernels are applied. Filters of the type are used for example in the context of the reconstruction of a three-dimensional processing dataset from the two-dimensional projection images of the image dataset and can serve to highlight certain anatomical structures in an enhanced manner and/or be particularly well suited for application to certain body regions. In this regard, totally different image results are achieved with different filter kernels, and consequently totally different visualization formats. For example, the image contents resulting from a filter kernel specialized for highlighting vessels within the torso are significantly different from those of a filter kernel for the torso relating to the rest of the anatomy. Already at this level, there are therefore significant differences that justify the use of the present invention.

However, it is particularly preferred within the scope of at least one embodiment of the present invention if the image dataset is a multi-energy dataset, i.e. an image dataset resulting from multi-energy computed tomography, and comprises different data subsets assigned to different energies and/or energy intervals, wherein in the course of the processing, in particular by a calculation sequence applied image element by image element to the data subsets, combination datasets are determined as processing datasets. Multi-energy tomography is, as already explained in the introduction, a type of energy-resolved computed tomography imaging which is mainly deployed in the field of medicine and is also referred to as spectral imaging. In this imaging technique, the energy dependence of the X-ray attenuation is used to advantage in order to obtain additional information which can be used in many different ways in the course of the evaluation. A well-known and often used example for the evaluation of multi-energy datasets is the method known as material decomposition, in which fractions of individual materials or material classes can be determined within the image dataset in order, for example, to enable material images or different combination images to be generated. In the context of examinations using multi-energy computed tomography, it is also possible to use contrast agents that may include a substance which exhibits a completely different energy-dependent attenuation behavior than at least a majority of the anatomy, i.e. which can be differentiated and extracted by evaluation of the multi-energy dataset. A contrast agent commonly used in the examination of vascular systems is iodine.

In this connection, there exist a multiplicity of possible, real-world example embodiments in which the present invention can be used.

If a user wishes to assess, for example, how active a tumor in the liver is, a factor of interest to him or her will be the takeup rate of the contrast agent, in particular iodine, within the liver, while at the same time, however, it is also important to be able to localize the liver. However, an evaluation algorithm which segments the liver cannot operate on the iodine map (as first processing dataset) desired by the user in this regard. It is therefore possible, according to the request information associated with this evaluation algorithm, to determine a second processing dataset which clearly shows the anatomy and, for example, also highlights organs, in particular the liver, and to provide this to the evaluation algorithm, wherein the localization information or segmentation information relating to the liver can particularly advantageously be represented as evaluation information directly together with the first processing dataset.

In another example, in order to be able to detect calcifications, a user can request a VNC image (virtual non-contrast image) as visualization format, i.e. have a corresponding first processing dataset determined. However, this does not show the contrast agent, for example iodine, so that evaluation algorithms which are intended to derive properties of the vascular tree cannot operate thereon effectively, such that, in this case also, on account of the corresponding request information, suitable second processing datasets, for example iodine maps, can be generated in the background and the resulting evaluation information can be combined with the first processing dataset to form the result that is to be visualized. A further important issue with regard to the use of iodinated contrast agent is also the, to some extent, greater difficulty in discriminating a vessel filled with iodinated contrast agent and bone, so that an evaluation algorithm may also relate to the detection and localization of bone material, which can then be removed from visualizations, for example, and/or excluded from the evaluation by other evaluation algorithms.

To put it more generally, when the image dataset acquired as a multi-energy dataset shows at least one anatomical region of the patient containing blood vessels with an iodinated contrast agent, it can therefore be provided that at least one evaluation algorithm relates to the detection and localization of bone material and/or at least one evaluation algorithm relates to the segmentation and/or localization of an anatomical structure, in particular at least one blood vessel and/or tumor and/or organ.

The multi-energy dataset can be acquired using different X-ray spectra and/or using a photon-counting X-ray detector. When an X-ray tube is used, different X-ray spectra can be generated by using different tube voltages, for example, in which case the corresponding X-ray spectra then have maxima at different X-ray radiation energies. Within the scope of the present invention, however, the use of photon-counting X-ray detectors is preferred. Photon counting is a technique in which individual photons are counted using a corresponding X-ray detector, which may also be referred to as a "single-photon detector" (SPD). The energy can also be ascertained for each detected photon, such that the event can be entered for example in an energy histogram comprising "slots" defined by energy intervals. Data subsets can then be derived herefrom for specific energies and/or specific energy intervals.

In a particularly advantageous development of at least one embodiment of the present invention, it can be provided that if the requirements of the request information cannot be met in full using the image dataset, a processing dataset determinable from the image dataset, similar to the dataset required according to the request information, in particular as far as possible containing at least one image content defined by the request information, is determined as the second processing dataset. Depending on the acquisition parameters used for acquisition of the image dataset, in photon counting, for example, the X-ray spectrum used, or in the case of measurements using a plurality of X-ray spectra, the choice thereof, it may be conceivable that certain processing datasets cannot be derived from the image dataset because information is missing, for example because no measurement can be taken in a relevant energy range. With regard thereto, this development of the invention provides for an initial check to determine whether the visualization format according to the request information, i.e. the nominal input data, can be calculated at all from the acquired image dataset. If this is not the case, a most similar processing dataset that can be calculated using the image dataset can be determined. If, for example, a monoenergetic image at 70 keV is required as input data of an evaluation algorithm, but this cannot be determined from the image dataset, a monoenergetic image at 50 keV can be used as the most similar determinable second processing dataset. In practice, it can be provided in this case that the request information describing alternatively determinable processing datasets is provided, i.e. already receives the necessary indications which input data can be used as an alternative while still retaining sufficient reliability of the result information of the evaluation algorithm. In addition or alternatively, it is, however, also conceivable that the processing parameters for determining the similar processing dataset are determined based upon an assignment rule describing the similarity ratio. Such an assignment rule can be for example a database and/or a look-up table in which processing datasets and/or request information are assigned similar processing datasets, i.e. in particular processing parameters thereof, and/or in which processing parameters for determining processing datasets, which can for example be part of the request information, are assigned permitted deviations.

A particularly beneficial embodiment of the present invention is produced when the evaluation information and the first processing dataset are evaluated and/or output together, in particular when a visualization result to be output is determined as the visualization dataset from the evaluation information and the first processing dataset. In this embodiment variant, the results of the respective steps, i.e. in particular the first processing dataset and the evaluation information, are also merged for processing purposes, in which case it is possible for example to take advantage of the fact that both refer to the same image dataset and in particular are even present in the same coordinate system, without any need for a registration. In particular, it is therefore possible to link evaluation information with first processing datasets and hence visualization formats which would be entirely unsuitable for determining the evaluation information. In this way, a clear gain is produced in terms of information and knowledge about the anatomical region shown in the image dataset, such that, in other words, both the quality and the quantity of the evaluation result are increased. This further results in the possibility to visualize the evaluation information in an intuitively ascertainable manner in the visualization format desired by the user, i.e. the first processing dataset. Apart from that, the quality of the first processing dataset can also be optimized using the evaluation information, in particular with regard to the examination objective and the improved assessment by the user.

In practice, it can be provided, for example, that at least one location-related portion of the evaluation information is output positionally accurately in the first processing dataset, in particular by overlaying. In this context, it can be provided, for example, that if the evaluation information comprises a segmentation result and/or some other localization result, the segmented and/or localized anatomical or other structure can be visualized positionally accurately in the first processing dataset, even when the structure cannot be seen there. Thus, for example, vessel courses can be inserted in a VNC image and/or other parts of the anatomy, for example organs, can be displayed in a pure contrast agent image. However, even above and beyond the segmentation and localization, information can be presented positionally accurately, for example dimensions of anatomical or other structures, for example vessel diameters, tumor dimensions and the like, measured at specific points. In such a case it is possible for example to superimpose a line segment next to which the corresponding value can be seen. Clearly, a multiplicity of different possibilities exists.

However, it is also conceivable in a particularly advantageous embodiment of the present invention that at least some of the evaluation information is used for modifying the first processing dataset prior to the output. This means that, above and beyond the user specification, or as an improvement within this, the visualization format can be optimized by further processing steps based upon the evaluation information. An actual embodiment in this context provides, for example, that the evaluation information used for the modification relates to a portion of the image that is to be removed in the first processing dataset, in particular a material class that is to be removed. The image portion is then removed accordingly for the modification. An example in this connection is bone material, which can be confused by a user for example when examining vascular systems containing calcifications and/or contrast agent, such that corresponding evaluation algorithms have been proposed in order to mark individual image elements as containing bone, which marking can of course, on account of the same underlying image dataset, also be transferred to the first processing dataset. In other words, it is therefore possible, for purposes of the modification, also actually to remove the image portion to be removed, for example bone material, for which purpose known approaches can be used, in particular interpolation and/or extrapolation methods and/or other ways for calculating out the information that is to be removed. In this way, the first processing dataset is rid of unwanted image contents and can therefore be interpreted much more readily and is focused on the relevant, wanted information. Essentially, other possibilities are, of course, also conceivable for using evaluation information in order to improve the first processing dataset. If it is a question, for example, of visualizing or detecting a particular organ whose position is known, an edge enhancement or the like can be performed locally.

However, the results of different evaluation algorithms can also be combined in order to generate common evaluation information. Thus, for example, it can be provided in practice that when multiple evaluation algorithms are used, result information of at least two evaluation algorithms is evaluated jointly for at least one of the at least one items of evaluation information. Alternatively, it is also possible within the scope of the present invention that at least one item of evaluation information is determined using processing data of the first processing dataset and from result information of at least one of the at least one evaluation algorithms. This means that the first processing dataset can also be taken into account, if this serves a purpose, in the determination of the evaluation information. In addition to the already described effect of the evaluation information on the first processing dataset or on the final visualization result that is to be output, it is therefore also possible to allow several evaluation algorithms to cooperate for determining evaluation information, in particular such algorithms that use different second processing datasets as input data, and/or to let the first processing data be incorporated into the evaluation information, which clearly represents the multiplicity of possible synergy opportunities improving the evaluation both qualitatively and quantitatively. If, for example, a variable dependent on the intensity in the first processing dataset is to be determined as evaluation information, position information ascertained by an evaluation algorithm, in particular segmentation information and/or localization information, can be used in order to discover the corresponding positions and to determine the variable. If different anatomical or other structures are processed by different evaluation algorithms, relative variables in relation to these structures can be established by aggregation of the evaluation algorithms.

Although it is mainly the particularly suitable application example of multi-energy computed tomography that is discussed within the scope of the present description, an advantage of the present invention resides precisely in the fact that it can be extended as necessary to cover extremely large areas of application, since many very different evaluation algorithms and visualization formats can be used for many very different image datasets. If, for example, an evaluation algorithm is to be added as a further option, this is easily possible without the need for a revision or reprogramming.

In particular, with regard to the desired visualization formats, there also exist a multiplicity of further real possibilities for the first processing dataset or the visualization result. Thus, for example, visualization formats may be wanted which permit a kind of flight through a hollow organ or the like, i.e. for example sectional images are generated in a plane perpendicular to a local orientation direction of the hollow organ or of the structure generally. It is known in this connection, for example, to "deconvolve" the course of a blood vessel, for example the aorta, in which case particularly advantageous evaluation information can also be integrated in such a visualization, for example radii, perfusion information and the like.

In addition to the method, at least one embodiment of the invention also relates to an imaging device, in the present case a computed tomography device, which comprises a control device embodied to perform the method according to at least one embodiment of the invention. All statements in relation to the method according to embodiments of the invention can be applied analogously to the imaging device according to embodiments of the invention, via which the already cited advantages can therefore likewise be achieved.

The imaging device of at least one embodiment comprises at least one image acquisition arrangement, which can be formed for example by an X-ray emitter and an X-ray detector, in particular a photon-counting X-ray detector, wherein, in the case of a computed tomography device, the image acquisition arrangement may be mounted for example in a gantry so as to be rotatable around the patient. The control device comprises, generally speaking, at least one processor and at least one storage device(s), wherein functional units for performing the method according to at least one embodiment of the invention can be implemented by way of the processor.

The evaluation algorithms, the image dataset and/or request information assigned to the evaluation algorithms can be stored in the storage device(s) of the control device, for example. The control device can beneficially comprise an interface for receiving the user information, which can also describe evaluation algorithms that are to be used. In practice, the control device may for example comprise
 a provider unit for providing the request information,
 a first determination unit for determining the first processing dataset, and
 a second determination unit for determining the second processing dataset,
 an evaluation unit for applying the at least one evaluation algorithm to the respective second processing dataset,
 a merging unit for merging the first processing dataset and the evaluation information into a visualization result (visualization dataset), and
 an output unit for outputting the visualization result on the visualization device.

Further functional units are, of course, also conceivable for further embodiments of the present invention; in particular, the control device may also include an acquisition unit for controlling the acquisition of the image dataset.

A computer program according to at least one embodiment of the invention can for example be loaded directly into a memory of a computing device, in particular of a control device of an imaging device, and comprises program segments/code for performing the steps of a method according to at least one embodiment of the invention when the computer program is executed in the computing device. The computer program may be stored on an electronically readable data medium according to at least one embodiment of the present invention, which data medium therefore comprises control information stored thereon, which information comprises at least one computer program according to at least one embodiment of the invention and is embodied in such a way that when the data medium is used in a computing device, in particular in a control device of an imaging resonance device, the computing device is prompted to perform the steps of a method according to at least one embodiment of the invention. The electronically readable data medium may be a non-transitory data medium, a CD-ROM, for example.

FIG. 1 shows a general flowchart of example embodiments of the method according to the invention. Here, the method is focused on the evaluation of image datasets produced by computed tomography, in this case by multi-energy computed tomography, though it may also comprise the acquisition thereof and consequently the control of the entire examination procedure on an imaging device, in this case a computed tomography device.

In the present example embodiment, at the start of an examination procedure on the imaging device, the examination is prepared in a step S1. This preparation also comprises a user at a user interface of the imaging device, which also comprises an input device, entering settings relating to the acquisition of the image dataset and also relating to the ensuing evaluation. In the present case, these user specifications also include user information received by the user interface in a step S1 and used in the method described here. The user information describes which visualization format the user wants for the image dataset to be acquired, for example whether he or she would like to see a monoenergetic image acquired at a specific X-ray radiation energy, whether he or she would like to view a VNC image or a specific material image. A wide variety of processing parameters can be provided here with regard to the visualization format, for example slice thicknesses, angular increments in the case of rotatable images, filters to be used, and the like. More complex visualization formats are also conceivable, such as views of hollow organs in which sectional images standing perpendicular to the course, are calculated.

In addition to the visualization format desired by the user, the user information can also describe which evaluation information is wanted, whether directly or indirectly, for example within the scope of specific evaluation packages. Wanted or useful evaluation information may also be yielded from the examination objective, sometimes also directly from the chosen visualization format. Thus, for example, certain visualization formats and certain useful evaluation information can be assigned to different examination objectives. If, for example, the user is interested in the perfusion in diseased tissue using contrast agent transported in the blood, for example iodinated contrast agent, the visualization format can relate to the contrast agent, though the location of the diseased tissue or at least of the affected organ or organs represents useful evaluation information for, on the one hand, making the visualization more intelligible and, on the other hand, also for performing further evaluation steps, for example also for quantifying the perfusion in regions of interest and the like. If, for example, calcifications in blood vessels are concerned, the display thereof, as well as possibly further evaluation information relating to the blood vessels, for example their radii or a flow rate, are useful.

What is remarkable about the two cited examples is that here, although the visualization format is extremely useful for the examination objective, it does not lend itself to determining the cited useful evaluation information therefrom. In this case, as will be demonstrated in the further course of the description, the described method provides a remedy in that the desired visualization format and the evaluation information are determined entirely automatically by the imaging device, in the present case only based upon the user information, and united in a synergetic visualization result. This all happens in the present case in a compact manner on and via the imaging device, wherein firstly, in step S2, which, as described, can but does not have to form a part of the method, the underlying image dataset for the evaluation is acquired.

The image dataset acquired in step S2 is in this case a multi-energy dataset, which therefore contains data subsets for different energies or energy intervals of the X-ray radiation. In this case, not only different X-ray spectra can be used on the part of the X-ray emitter, for example different tube voltages in the case of an X-ray tube, but also photon-counting X-ray detectors, the latter being preferred since then in particular a fixed X-ray spectrum can be used and, if necessary, a finer resolution in terms of the energies is possible.

Without a further user interaction now being necessary, the automatic evaluation of the image dataset is carried out in steps S3 to S8 via a control device of the imaging device. As a basis, request information is provided in step S3 in addition to the already present user information for each evaluation algorithm that is to be used in order to determine the evaluation information. The request information describes which input data is required by the respective evaluation algorithm, and may also already comprise suitable processing parameters in respect of the processing of the image dataset in order to obtain the input data. The request information can for example be assigned to each evaluation algorithm and already be available in a storage device(s) of the control device of the imaging device, but in addition or alternatively can also be retrieved from elsewhere. The same applies to the evaluation algorithms themselves. At the same time, it is preferred in any case if the evaluation algorithms to be used can be derived at least to some extent also from the user information, in which case, for example, the above-cited assignment of useful evaluation information to examination objectives can be referred to. Useful evaluation information can also be assigned to visualization formats. Further information, for example the scanned body region, can be used. For certain examination protocols, for example "multi-energy tomography on the thoracic vascular system", it is also conceivable to assign evaluation algorithms and evaluation information which are inherently beneficial.

In steps S4 and S5, processing datasets are then determined independently and separately from one another, firstly, according to the user information, a first processing dataset which reproduces the desired visualization format in step S4, and secondly, in step S5, at least one second processing dataset which is suitable as input data for at least one of the at least one evaluation algorithms. In this regard, it should already be noted at this point that at least some of the evaluation algorithms available on the imaging device can comprise a trained function, i.e. artificial intelligence. These evaluation algorithms, more accurately their trained functions, have then also been trained with corresponding input data, i.e. second processing datasets derived from training image datasets. Accordingly, supplied with suitable input data, they deliver desired result information for the evaluation information in a robust and reliable manner.

In a step S6, the respectively determined second processing datasets, which themselves may correspond to certain visualization formats, i.e. show image contents required for the evaluation algorithm, are provided as input data to the respective evaluation algorithm, which determines corresponding result information from which the evaluation information is then derived.

In this regard, it should also be noted at this point that it is conceivable that, on account of the acquisition parameters, an image dataset is not suitable for completely fulfilling the request information for at least one of the at least one evaluation algorithms. Beneficially, in that case, a similar processing dataset providing at least the same image contents can be generated as a replacement and provided as input data. The request information itself may already contain corresponding fallback solutions; it is also conceivable, however, to use an assignment rule, for example a database or look-up table, in which request information or the second processing datasets fulfilling the request information are assigned fallback solutions, for example by providing corresponding processing parameters. Processing parameters can also be directly assigned intervals or permitted deviations. In this way it is made possible to use the corresponding evaluation algorithm nonetheless.

In step S6, if the result information does not directly constitute evaluation information, some of the result information can also be linked further to the wanted evaluation information. This means it is conceivable to use a plurality of evaluation algorithms with different result information in order to determine the actually wanted evaluation information therefrom.

In a step S7, the results of steps S4 and S6 are then merged in order to obtain a visualization dataset as visualization result. In this connection, it is conceivable on the one hand to supplement the evaluation information further, for example by merging at least one item of result information and processing data of the first processing dataset of step S4 for evaluation, for example in the interests of using localized image information in the processing data of the first processing dataset.

In the present case, however, it is provided in any event that the evaluation information and the first processing dataset are evaluated jointly in step S7. To that end, at least a part of the evaluation information is used for modifying the first processing dataset prior to the output, in order for example to remove unwanted image portions or the like. At the same time, however, via this joint evaluation, a visualization result is also generated in step S7 in which the evaluation information is visualized at least to some extent within the first processing dataset.

For this purpose, location-related portions of the evaluation information are particularly advantageously output positionally accurately in the first processing dataset, in which case for example an overlaying can take place. For example, it is conceivable to insert limitations of detected or segmented anatomical or other structures or even quantitative data relating to these in a positionally accurate manner and thus incorporate them into the visualization result.

In a step S8, the joint output of the first processing dataset and the evaluation information is then performed in the form of the visualization result. In this regard, it is of course also conceivable to output non-location-related, in particular general, portions of the evaluation information present in addition, for example adjacent to an output of the first processing dataset in image form.

In addition to the output on a visualization device, the visualization result can also be stored, in particular together with the image dataset and/or the first processing dataset and/or the evaluation information.

Figure 2:
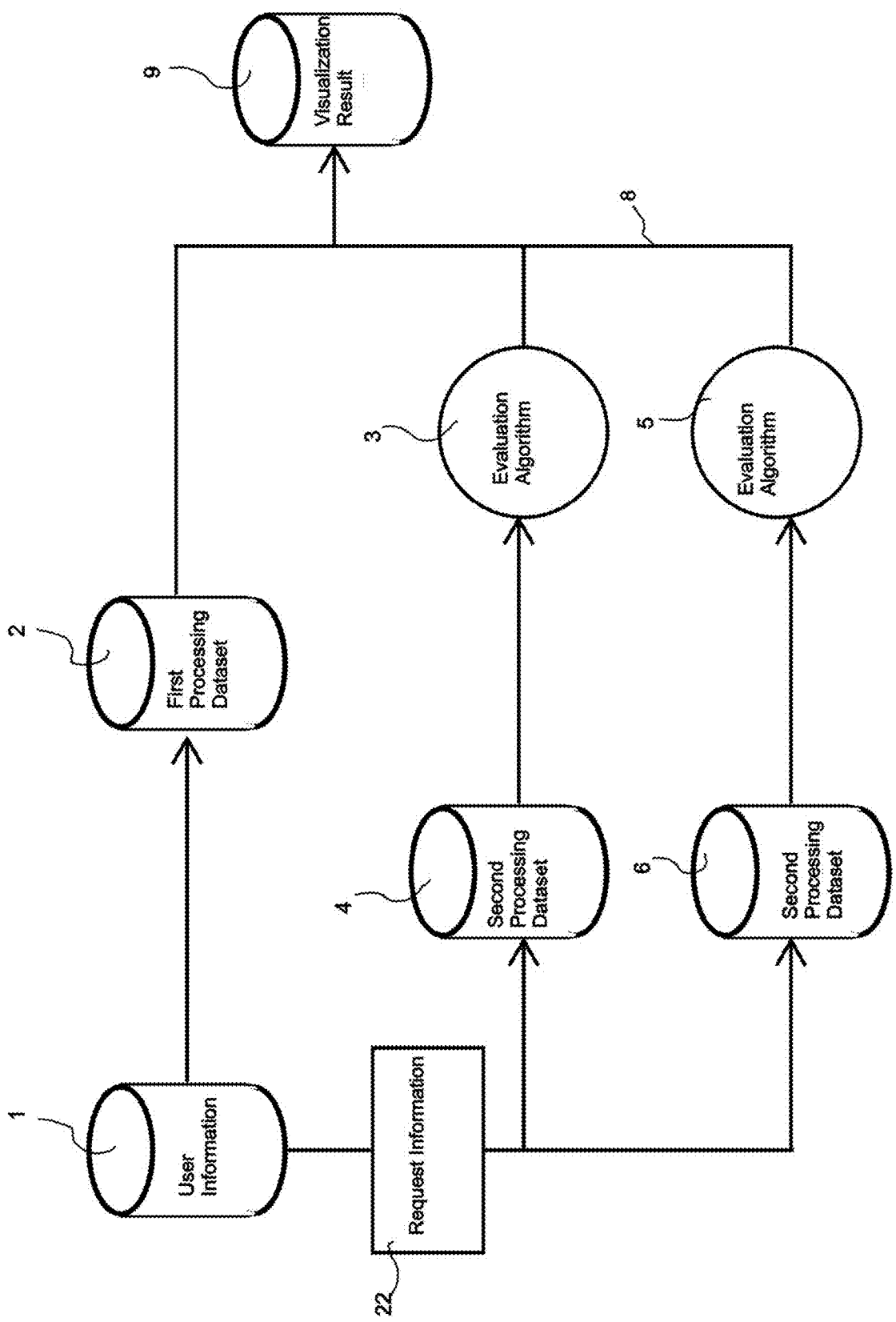
FIG. 2 shows an illustration of an actual example embodiment of the method according to the invention.

FIG. 2 shows an example application case of the method according to FIG. 1 in a schematic illustration. In this case, user information 1 input for an examination procedure can for example describe that a VNC image at least of the scanned aorta is wanted as visualization format, wherein a filter kernel specifically geared to the representation of blood vessel systems is to be used for the reconstruction. A thin-slice dataset is to be prepared for the visualization, and rotations using a step size of 10° are to be possible. Also, the radius range of the aorta is to be analyzed according to the user information.

Furthermore, it is known in the control device that in such acquisition procedures, in this case multi-energy thorax scans, the image dataset could contain unwanted bone fractions, which are intended to be removed.

Accordingly, three processing datasets are determined in the present case. The first processing dataset 2 is, as required as the visualization format, a VNC image containing thin slices using the desired filter kernel.

This first processing dataset 2 would be totally unsuitable for determining the radii of the aorta since the contrast agent, in this case an iodinated contrast agent, would not be visible in a VNC image and therefore it would scarcely be possible to detect the vessels automatically. In the present case, however, a segmentation at least of the aorta is necessary, for which purpose a corresponding evaluation algorithm 3 is to be used whose input data, described by assigned request information 22, is to comprise a monoenergetic 70-keV image comprising thin slices and also a specific filter kernel for the reconstruction. Precisely such a second processing dataset 4 is determined by a corresponding determination unit in the control device.

With regard to the removal of bone material, a further evaluation algorithm 5 is to be used which delivers image elements containing bone as result information, and here also evaluation information, which evaluation algorithm 5 requires as input data a monoenergetic 55-keV image comprising thin slices and also a specific filter kernel, which image is likewise provided accordingly as a further second processing dataset 6.

In the merging step (S7) indicated here by the arrow 8, the evaluation information of the evaluation algorithm 5 is now used to calculate out bone fractions in the first processing dataset 2. At the same time, the aorta segmented via the evaluation algorithm 3 as equally location-related evaluation information is marked via an overlay in the first processing dataset 2; radii of the aorta determined as part of the evaluation can likewise be indicated positionally accurately at various points, where the user can place them directly in context with calcifications to be seen for example in the VNC image. In this way there is produced the visualization result 9, which is then output on the visualization device, namely a VNC image containing thin slices and rotatable in 10° increments, reconstructed using the desired filter kernel, which VNC image additionally contains positionally accurate information on the aorta and its radii, although this information would not have been obtainable from the first processing dataset 2. Furthermore, no more disruptive bone fractions are to be seen.

It should be noted in this regard that further evaluation information can, of course, also be determined using processing data of the first processing dataset 2, in particular following removal of the bone fractions; for example, calcifications can be detected in a targeted manner and to some extent also be quantified by using a bounding box determined according to the segmentation of the aorta, and the like.

Figure 3:
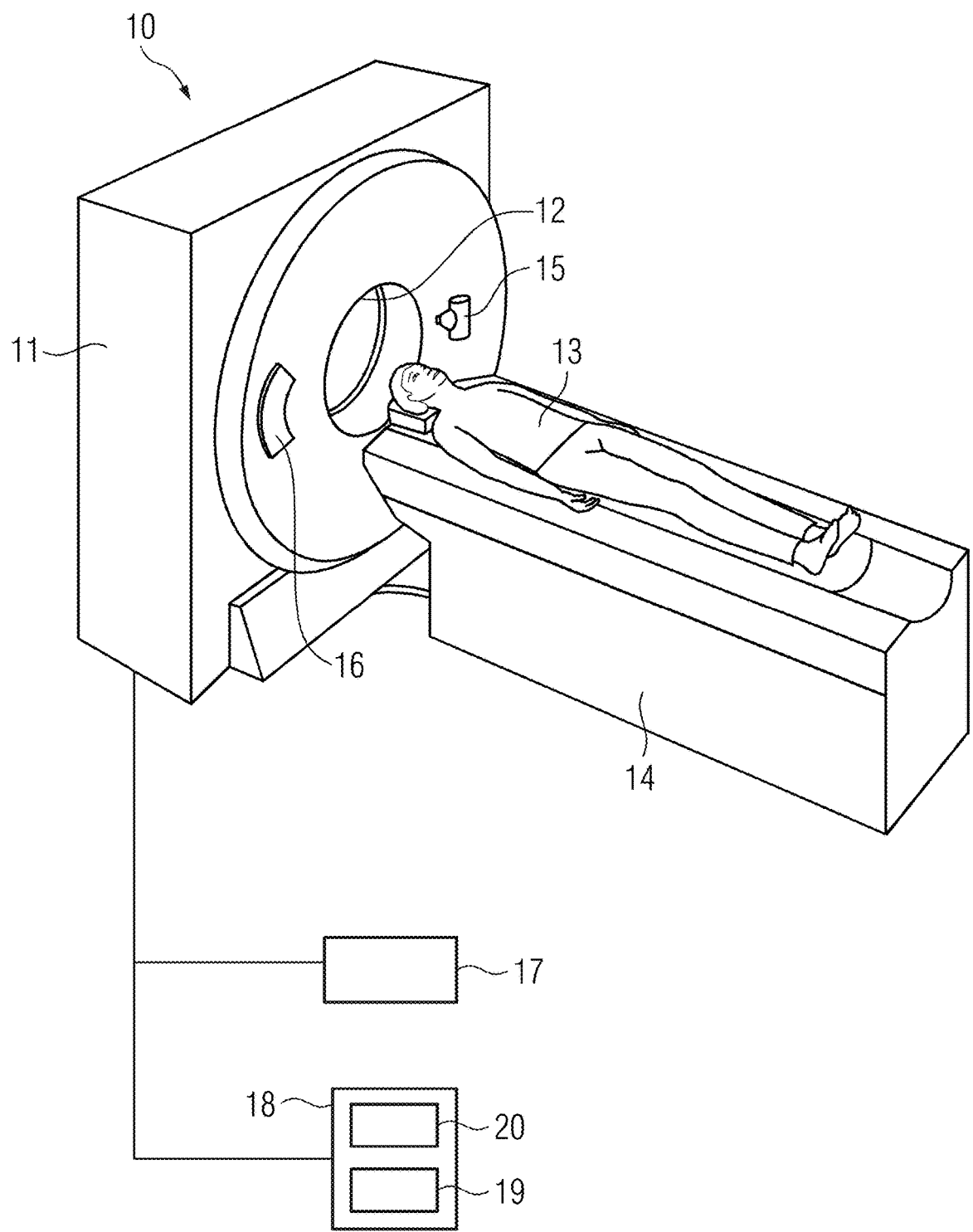
FIG. 3 shows an imaging device according to an embodiment of the invention.

FIG. 3 shows a schematic diagram of an imaging device 10 according to an embodiment of the invention, in this case a computed tomography device. As is generally known, this comprises a gantry 11 which encompasses a patient receiving zone 12 into which a patient 13 can be introduced via a motorized patient couch 14 in such a way that the anatomical region to be scanned lies in the field of view of an image acquisition arrangement that is rotatably mounted in the gantry 11. In the present example, the image acquisition arrangement comprises an X-ray emitter 15 and an X-ray detector 16, in the present case a photon-counting X-ray detector 16.

The operation of the imaging device 10 is controlled by a control device 17, which is also embodied to perform the method according to an embodiment of the invention.

In addition, the imaging device 10 also includes a user interface 18, which in the present case comprises an input device 19 and a visualization device 20.

FIG. 4 shows in more detail the functional layout of the control device 17 for enabling the method according to an embodiment of the invention to be performed. The control device comprises firstly a storage device(s) 21 in which, as well as the evaluation algorithms 3, 5 and their assigned request information 22, the described assignment rule, if used, can also be stored. Furthermore, the storage device(s) 21 is suitable for storing user information obtained via an interface 23 from the user interface 18, just like image datasets acquired, in particular according to step S2, via an acquisition unit 24.

Processing datasets 2, 4, 6, visualization results 9, evaluation information and the like can also be stored in the storage device(s) 21, at least for examination procedures or their evaluation procedures.

In order to perform the method according to an embodiment of the invention, the control device 17 firstly comprises a provider unit 25 for providing, in this case selecting, the corresponding required request information 22 according to step S3. In a first determination unit 26, the user information 1 is used in order to determine the first processing dataset 2; in a further, second determination unit 27, the at least one second processing dataset 4, 6 is calculated, the processing datasets 2, 4, 6 being determined in each case from the image dataset. The first determination unit 26 therefore performs step S4, the second determination unit 27 step S5.

In an evaluation unit 28, the at least one evaluation algorithm 3, 5 is executed according to step S6 using the respective second processing dataset 4, 6 as input data in order to obtain result information/evaluation information. This is forwarded together with the first processing dataset 2 of the first determination unit 26 to a merging unit 29, which determines the visualization result 9, cf. also step S7. An output unit 30 actuates the visualization device 20 in order to output the visualization result 9.

Although the invention has been illustrated and described in more detail based upon the preferred example embodiment, the invention is not limited by the disclosed examples and other variations may be derived herefrom by the person skilled in the art without leaving the scope of protection of the invention.

Of course, the embodiments of the method according to the invention and the imaging apparatus according to the invention described here should be understood as being example. Therefore, individual embodiments may be expanded by features of other embodiments. In particular, the sequence of the method steps of the method according to the invention should be understood as being example. The individual steps can also be performed in a different order or overlap partially or completely in terms of time.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method for operating a medical imaging device to evaluate a computed tomography image dataset acquired via the medical imaging device from which image dataset processing datasets reproducing different image data contents are determinable via image processing, the method comprising:
   receiving at least one item of user information describing a desired visualization format of the computed tomography image dataset;
   providing at least one item of request information describing required input data of at least one evaluation algorithm to be used;
   determining at least one first processing dataset corresponding to the visualization format according to the at least one item of user information and a respective at least one second processing dataset usable as input data for a respective evaluation algorithm of the at least one evaluation algorithm, according to the at least one item of request information;
   determining the second processing dataset as a processing dataset determinable from the computed tomography image dataset, similar to the computed tomography image dataset required according to the request information, in response to the request information not being completely fulfillable using the computed tomography image dataset;

applying the at least one evaluation algorithm to the respective at least one second processing dataset to determine evaluation information; and outputting the at least one first processing dataset and the evaluation information on a visualization device.

2. The computer-implemented method of claim 1, wherein at least one of the at least one evaluation algorithms includes a trained function which has been or is trained using respective at least one second processing datasets, or the at least one first processing dataset does not fulfill a requirement of the at least one item of request information.

3. The computer-implemented method of claim 2, wherein the image dataset is a multi-energy dataset and includes different data subsets assigned to at least one of different energies or energy intervals, and the method further comprises:

determining combination subsets as the at least one first and second processing datasets via a calculation sequence applied image element by image element to data subsets.

4. The computer-implemented method of claim 3, further comprising:

acquiring the multi-energy dataset using at least one of different X-ray spectra or a photon-counting X-ray detector.

5. The computer-implemented method of claim 2, further comprising at least one of:

providing the request information, wherein the request information describes alternatively determinable processing datasets; or determining processing parameters for determining a similar processing dataset based upon an assignment rule describing a similarity ratio.

6. The computer-implemented method of claim 2, wherein the evaluation information and the at least one first processing dataset are at least one of evaluated or output together.

7. The computer-implemented method of claim 1, wherein the image dataset is a multi-energy dataset and includes different data subsets assigned to at least one of different energies or energy intervals, and the method further comprises:

determining combination subsets as the at least one first and second processing datasets via a calculation sequence applied image element by image element to data subsets.

8. The computer-implemented method of claim 7, further comprising:

acquiring the multi-energy dataset using at least one of different X-ray spectra or a photon-counting X-ray detector.

9. The computer-implemented method of claim 1, further comprising at least one of:

providing the request information, wherein the request information describes alternatively determinable processing datasets; or determining processing parameters for determining a similar processing dataset based upon an assignment rule describing a similarity ratio.

10. The computer-implemented method of claim 1, wherein the evaluation information and the at least one first processing dataset are at least one of evaluated or output together.

11. The computer-implemented method of claim 10, wherein at least one location-related portion of the evaluation information is output positionally accurately in the at least one first processing dataset.

12. The computer-implemented method of claim 11, wherein the at least one location-related portion of the evaluation information is output positionally accurately in the at least one first processing dataset by overlaying.

13. The computer-implemented method of claim 11, further comprising:

modifying the at least one first processing dataset using at least some of the evaluation prior to the outputting.

14. The computer-implemented method of claim 10, further comprising:

modifying the at least one first processing dataset using at least some of the evaluation information prior to the outputting.

15. The computer-implemented method of claim 14, wherein the evaluation information used for the modification relates to a portion of the image to be removed in the at least one first processing dataset.

16. The computer-implemented method of claim 1, wherein when multiple evaluation algorithms are used, the method comprises at least one of:

evaluating result information of at least two evaluation algorithms of the multiple evaluation algorithms jointly for at least one of the at least one items of evaluation information; or determining at least one item of evaluation information using processing data of the first processing dataset and result information of at least one of the at least one evaluation algorithms.

17. The computer-implemented method of claim 1, wherein the image dataset acquired as a multi-energy dataset shows at least one anatomical region of a patient containing blood vessels with an iodinated contrast agent, and wherein at least one of at least one evaluation algorithm relates to detection and localization of bone material, or at least one evaluation algorithm relates to at least one of segmentation or localization of an anatomical structure.

18. The computer-implemented method of claim 1, wherein the medical imaging device is configured to produce the image data via multi-energy computed tomography.

19. The computer-implemented method of claim 1, wherein the providing of the at least one item of request information describing required input data of at least one evaluation algorithm to be used, is provided according to the user information received.

20. A medical imaging device, comprising:

a controller for operating the medical imaging device to evaluate a computed tomography image dataset acquired via the medical imaging device from which image dataset processing datasets reproducing different image data contents are determinable via image processing, the controller being configured to cause the medical imaging device to receive at least one item of user information describing a desired visualization format of the computed tomography image dataset, provide at least one item of request information describing required input data of at least one evaluation algorithm to be used, determine at least one first processing dataset corresponding to the visualization format according to the at least one item of user information and a respective at least one second processing dataset usable as input data for a respective evaluation algorithm of the at least one evaluation algorithm, according to the at least one item of request information, determine the second processing dataset as a processing dataset determinable from the computed tomography image dataset, similar to the computed tomography image dataset required according to the request information, in response to the request information not being completely fulfillable using the computed tomography image dataset, apply the at least one evaluation algorithm to the respective at least one second processing dataset to determine evaluation information, and output the at least one first processing dataset and the evaluation information on a visualization device.

21. The medical imaging device of claim 20, wherein the medical imaging device is a computed tomography device.

22. A non-transitory computer program product storing a computer program that, when executed on a control device of an imaging device, performs a method for operating the imaging device to evaluate a computed tomography image dataset acquired via the imaging device from which image dataset processing datasets reproducing different image data contents are determinable via image processing, the method comprising:

receiving at least one item of user information describing a desired visualization format of the computed tomography image dataset;

providing at least one item of request information describing required input data of at least one evaluation algorithm to be used;

determining at least one first processing dataset corresponding to the visualization format according to the at least one item of user information and a respective at least one second processing dataset usable as input data for a respective evaluation algorithm of the at least one evaluation algorithm, according to the at least one item of request information;

determining the second processing dataset as a processing dataset determinable from the computed tomography image dataset, similar to the computed tomography image dataset required according to the request information, in response to the request information not being completely fulfillable using the computed tomography image dataset;

applying the at least one evaluation algorithm to the respective at least one second processing dataset to determine evaluation information; and outputting the at least one first processing dataset and the evaluation information on a visualization device.

23. A non-transitory electronically readable data medium storing a computer program to perform the method of claim 1 upon being executed on a control device of an imaging device.

* * * * *